United States Patent
Kortekaas et al.

(10) Patent No.: US 7,228,815 B2
(45) Date of Patent: Jun. 12, 2007

(54) METHOD OF PERFORMING AN ANIMAL RELATED ACTION ON AN ANIMAL AND A DEVICE FOR PERFORMING SAID METHOD

(75) Inventors: Martinus Petrus Kortekaas, Lisse (NL); Karel van den Berg, Bleskensgraaf (NL)

(73) Assignee: Lely Enterprises AG, Butzenweg (CH)

( * ) Notice: Subject to any disclaimer, the term of this patent is extended or adjusted under 35 U.S.C. 154(b) by 0 days.

(21) Appl. No.: 10/250,254

(22) Filed: Jun. 18, 2003

(65) Prior Publication Data

US 2003/0233983 A1    Dec. 25, 2003

(30) Foreign Application Priority Data

Jun. 24, 2002    (NL) .................................... 1020931

(51) Int. Cl.
*A01J 5/00*    (2006.01)
*A01J 7/00*    (2006.01)

(52) U.S. Cl. ................. 119/14.02; 119/14.08

(58) Field of Classification Search ............... 119/14.1, 119/14.14, 14.2, 14.08, 14.02, 651
See application file for complete search history.

(56) References Cited

U.S. PATENT DOCUMENTS 5,042,428 A    8/1991    Van der Lely et al.

2002/0152963 A1    10/2002    Vijverberg

FOREIGN PATENT DOCUMENTS

| DE | 4113700 A | 10/1992 |
|----|-----------|---------|
| EP | 0647393 A | 4/1995 |
| EP | 1027823 A | 8/2000 |
| EP | 1125492 A | 8/2001 |
| WO | WO 9808376 A | 3/1998 |

*Primary Examiner*—Son T. Nguyen
(74) *Attorney, Agent, or Firm*—Jacobus C. Rasser; Howrey LLP; David P. Owen

(57) ABSTRACT

A method of performing an animal related action on an animal by means of a robot arm is disclosed. The method includes carrying out measurements on the animal by means of a sensor for locating at least one animal part, generating, on the basis of the measurements, a list of data each corresponding to a possible animal part, comparing the data on the list with historical data regarding at least one animal part, assigning to each of the data on the list, on the basis of the comparison, a probability value for actual correspondence with at least one animal part, selecting as target position that possible target position that corresponds to the data on the list having the highest probability value and moving the robot arm to the target position which corresponds to the animal part found and performing there the animal related action.

22 Claims, No Drawings

METHOD OF PERFORMING AN ANIMAL RELATED ACTION ON AN ANIMAL AND A DEVICE FOR PERFORMING SAID METHOD

CROSS REFERENCE TO RELATED APPLICATIONS

This application claims priority from Dutch patent application no. 1020931 filed 24 Jun. 2002, the contents of which are hereby incorporated by reference in their entirety.

BACKGROUND OF INVENTION

1. Field of the Invention

The invention relates to the field of animal husbandry and more particularly to a method of performing an animal related action on an animal by means of a robot arm. The invention further relates to a device for performing said method.

2. Description of the Related Art

It is known to perform animal related actions on an animal using a robot arm. Such animal related actions may include milking, cleaning and other actions related to animal husbandry. In order to perform such actions it may be necessary to first carry out measurements on the animal by means of a sensor for the purpose of locating the animal part to be treated. After successful location of the animal part, the robot arm is moved to a target position relative to that part and the animal related action is performed.

In such known devices, it may sometimes happens that, by means of the sensor, objects are found that do not correspond to the animal part searched. This leads to incorrect movements of the robot arm and consequently to loss of time. Therefore, it is of great importance that locating an animal part takes place in an accurate and exact manner.

SUMMARY OF INVENTION

According to the present invention there is provided an improved method of performing an animal related action on an animal part by means of a robot arm. This is achieved by carrying out measurements on an animal by means of a sensor; generating, on the basis of the measurements, measured data corresponding to possible animal parts; comparing the measured data with historical data for the animal part; assigning to the measured data, on the basis of the comparison, a probability value for actual correspondence with the animal part; selecting a possible animal part that corresponds to the data on the list having the highest probability value; moving the robot arm to a target position related to the relevant action and to the position of the selected animal part; and performing the animal related action.

The invention is based on the insight that, by generating the measured data and comparing this with historical data, a high degree of accuracy in locating an animal part can be attained.

The animal related action may be for example the cleaning of the udder or the connection of teat cups to the teats of an animal to be milked by means of the robot arm of a milking robot. For that purpose the robot arm is movable to a target position that depends on the nature of the action to be performed and on the position of the animal part to be treated. For connecting a teat cup, said target position will be situated for example some centimetres under the relevant teat. First, the position of the teat is determined by means of a sensor (for example a laser or an ultrasonic sensor), after which the robot arm is moved to its target position for connecting there the teat cup. Subsequently, the robot arm can connect the next teat cup. Instead of one by one, it is also possible to carry out the measurements and the connection in pairs or for all four teats at one time. The sensor may be (but does not have to be) fitted to, on or in the robot arm.

According to the invention, there may be generated a list with measured candidate-positions for animal parts to be treated. The data on the list (for example co-ordinates in x, y and z direction relative to a defined reference point) are compared with historical data and are assigned, on the basis thereof, a probability value giving an indication of the probability that the relevant data actually correspond to an animal part searched. For example, a candidate-teat-position situated close to a historically known teat position is probably the correct teat position. Subsequently, from the candidate-positions on the list (for a given teat or for all the teats) the most probable one is chosen. In this manner, by means of measurements, objects found that do not correspond to animal parts searched can be eliminated to a high degree of reliability.

DETAILED DESCRIPTION

The invention will be explained hereinafter in further detail with reference to particular embodiments. These embodiments describe the application of the method to a milking robot.

A milking robot for automatically connecting teat cups to the teats of an animal to be milked is provided with a controllable robot arm, with identification means for identifying an animal, with at least one sensor for locating teats, with a milking device with teat cups and associated tubes and lines, and with a computer for controlling the robot arm.

The milking robot may for instance be of the type described in U.S. Pat. No. 5,042,428 to Van der Lely et al. entitled "Implement for milking an Animal" the contents of which are hereby incorporated by reference in their entirety. A particularly advantageous sensor arrangement is that known from U.S. patent publication No. US 2002/0152963 entitled "Device for determining the position of a teat of an animal" the contents of which are also hereby incorporated by reference in their entirety.

By means of the sensor, measurements are carried out on the animal. The area surrounding the teats of the animal may for example be scanned by means of a laser. The laser will then find a number of objects, among which are most likely also the teat or teats searched. The laser is connected to the computer that is provided with suitable software for processing the data from the laser. The software gives as output for example the target positions that correspond to the objects scanned. Therefore, when searching for teats, the target positions are co-ordinates of points in the space situated for example 5 cm under the ends (conjectured by the laser and the software) of the (conjectured) teats.

In the computer, a list of data (e.g. co-ordinates) each corresponding to a possible animal part (e.g. teats) is generated by suitable software on the basis of the measurements. The computer is provided with historical data in relation to the teats of each animal to be milked, such as for example their (possibly average) position or target position at the last milking or milkings, the mutual position of the four teats, the length and thickness of the teats, etc. With the aid of the software, the data in the list in the computer are compared with the historical data.

On the basis of the comparison, the software assigns to each of the data (e.g. co-ordinates) on the list a probability value for actual correspondence with at least one animal part (e.g. a teat). This probability value may be for example a figure on a scale from 0 to 100, in which case 0 means that the target position almost certainly does not correspond to a teat searched and 100 means that the target position almost certainly corresponds to a teat searched. The assignment of the probability value may take place on the basis of the calculated distance between the measured target position and the historical target position (s), a lower figure being assigned in case of a greater distance. If several teats are searched, it is also possible to assign several values to the data. A set of co-ordinates found on the list may have for example a high value or score for a particular teat (right rear) and a low value for another teat (left front).

Subsequently, with the aid of the software, the computer selects the possible target position that corresponds to the data on the list having the highest probability value for a given part or for any animal part. Consequently, on searching a particular teat (for example, the left front teat), the target position having the highest score for that teat is chosen. When not a particular teat, but any teat is searched, the target position having the highest score for all teats is chosen. Finally, the robot arm is moved to that target position for performing there the relevant action (such as for example the connection of a teat cup to the teat).

In order to attain an even higher degree of accuracy, according to the invention, the step of comparing the data may also include a search for predetermined patterns in the data. It is possible for example to determine from the mutual positions of the found, conjectured teats whether said teats are indeed the teats searched. When a particular pattern of spatial co-ordinates of four teat positions (or the target positions associated therewith) is measured that substantially corresponds to a pattern of teat positions (or target positions) that is known from the historical data, the assigned probability value(s) of the relevant data is (are) adapted (e.g. increased), because the probability that it indeed concerns the teats searched has increased.

In order to achieve even better results, according to the invention, it is possible to carry out further measurements on the animal by means of at least one further sensor. The further measurements may be added to the data on the list, the step of comparing the data including the comparison of the data on the list with relevant historical data.

It is possible for example that (besides the measurements of co-ordinates by means of the laser) the further measurements comprise the determination of colour and/or temperature and/or (light) intensity, and that the step of comparing the data also includes the comparison of colours, temperatures or (light)intensities respectively. The further measurements may also comprise the determination of the thickness and/or length and/or coarseness of an animal part, and the step of comparing the data may also include the comparison of data regarding thickness, length or coarseness respectively. When the colour and/or temperature and/or (light) intensity and/or thickness and/or length and/or coarseness of an object substantially correspond(s) to historical data regarding one or more animal parts searched, this is a (further) indication that the object actually corresponds to an animal part searched. It is then possible, on the basis of the comparison by means of the further measurements, again to adapt the assigned probability values of the relevant data. In this manner there is attained a high degree of reliability and accuracy of the method.

According to the invention, it is also possible not to measure co-ordinates, but only to carry out the above-mentioned "further measurements" regarding colour and/or temperature and/or (light) intensity and/or thickness and/or length and/or coarseness of an object. Although measuring co-ordinates leads to excellent results, it has been found that the "further measurements" per se may also provide a sufficiently high accuracy.

According to an embodiment of the invention, the method also comprises the step of up-dating the historical data. The computer and the software may thus always have up-to-date, reliable data. It is also possible to store at least temporarily data having a high probability value. For it may happen that a second highest probability value does not correspond to the animal part searched at a momentary search attempt, but does correspond to an animal part searched at a next search attempt.

The step of generating the list may include generating data corresponding to one possible animal part or to more than one possible animal part or to a pattern or a combination of possible animal parts. It is possible for example to put on the list the co-ordinates of the target position associated with one teat, but also the co-ordinates of the target position associated with a pattern formed by two teats situated close to each other. Then the two teats are considered together as it were as one object. At correspondence with historical data for a known pair of teats during the step of comparing, it is possible to draw to a high degree of certainty the conclusion that the object found indeed concerns the two teats.

As already described above, the method may advantageously be applied to a milking robot. The device is then provided with a computer in which software is programmed that is suitable for processing the measurements carried out by the sensor. In that case the software is suitable for recognising possible animal parts and determining target positions associated therewith.

In a preferred embodiment of the invention, the sensor(s) is (are) fitted to, on or in the robot arm, the robot arm being controllable in such a way that it follows an animal part or a pattern or a combination of animal parts located in the case of possible movements. When carrying out the measurements on the animal, the robot arm with the sensor has already been moved so as to be in the vicinity of the animal parts searched. By following an animal part found or for example a combination of two teats situated close beside each other, there is achieved a gain in time. For, in this manner, the target position for the robot arm can be attained more quickly.

Other animal related actions including cleaning and treating hooves or other body parts, branding, marking and administering medication may also be performed using the device and method described.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A method of performing an animal related action on an animal part by means of a robot arm, the method comprising:

carrying out measurements on an animal by means of a sensor;

generating, on the basis of the measurements, measured data corresponding to a number of objects;

comparing the measured data with historical data for the animal part;

assigning to the measured data for each object, on the basis of the comparison, a probability value on a scale of probability values for actual correspondence with the animal part;

selecting, on the basis of the probability value, an object from the number of objects that corresponds to the measured data having the highest probability value;

moving the robot arm to a target position related to the relevant action and to the position of the selected object; and performing the animal related action.

2. The method as claimed in claim 1, wherein the measurements comprise a determination of spatial co-ordinates, and the comparison of the measured data with the historical data comprises a comparison of spatial co-ordinates.

3. The method as claimed in claim 1, wherein the comparison of the data also comprises searching for predetermined patterns in the data.

4. The method as claimed in claim 3, wherein the measurements comprise a determination of spatial co-ordinates, and the comparison of the measured data with the historical data comprises a comparison of patterns of spatial co-ordinates.

5. The method as claimed in claim 3, wherein, on detecting one or more predetermined patterns, the assigned probability value of the relevant data is adapted.

6. The method as claimed in claim 1, wherein the method further comprises carrying out further measurements on the animal by means of at least one further sensor, and including the further measurements with the measured data.

7. The method as claimed in claim 6, wherein the measurements or the further measurements comprise a determination of colour or temperature or light intensity, and wherein the comparison of the measured data with the historical data comprises a comparison of colours, temperatures or light intensities respectively.

8. The method as claimed in claim 6, wherein the measurements or the further measurements comprise a determination of thickness or length or coarseness of an animal part, and wherein the comparison of the measured data with the historical data comprises a comparison of data regarding thickness, length or coarseness respectively.

9. The method as claimed in claim 6, wherein, on the basis of the comparison of the measured data from the further sensor with the historical data, the assigned probability values of the relevant data are adapted.

10. The method as claimed in claim 1, wherein the method further comprises updating the historical data.

11. The method as claimed in any one of claims 1, wherein the comparison of the measured data with the historical data comprises a comparison of combinations of possible positions with combinations of historically known positions of several animal parts.

12. The method as claimed in claim 1, wherein measured data having a high probability value is stored at least temporarily.

13. The method as claimed in claim 1, wherein the generation of the measured data includes generating data corresponding to a pattern or a combination of possible animal parts.

14. The method as claimed in claim 13, wherein the generation of the measured data includes generating data corresponding to two possible animal parts situated close to each other.

15. The method as claimed in claim 1, wherein the comparing of the measured data, the assigning of the probability values and the selecting of die possible animal part are performed by a processor, wherein the historical data is contained in a data storage device and wherein the moving of the robot arm is performed by a robot arm controller.

16. A method of performing an animal related action on an animal part by means of a robot arm, the method comprising:

carrying out measurements on an animal by means of a sensor;

generating, on the basis of the measurements, measured data corresponding to a number of objects;

comparing in a first comparison the measured data with historical data for a first animal part;

comparing in a second comparison the measured data with historical data for a further animal part;

assigning to the measured data for each object, on the basis of the first comparison, a probability value on a scale of probability values for actual correspondence with the first animal part;

assigning to the measured data for each object, on the basis of the second comparison, a probability value for actual correspondence with the further animal part;

selecting, on the basis of the probability value an object from the number of objects that corresponds to the measured data having the highest probability value;

moving the robot arm to a target position related to the relevant action and to the position of the selected object; and performing the animal related action.

17. A device for performing an animal related action on an animal, the device comprising:

a robot arm for performing the animal related action;

a sensor for carrying out measurements on the animal and generating measurement data related to a number of objects;

a data storage device for storing historical data for a given animal part;

a processor for comparing the measurement data with the historical data and assigning a probability weighting on a scale of probabilities to each object on the basis of the comparison; and a robot arm controller for moving the robot arm to a target position related to the object having the highest probability weighting.

18. The device as claimed in claim 17, wherein the device is a milking robot.

19. The device as claimed in claim 17, wherein the device further comprises a computer containing programmed software for processing the measurements carried out by the sensor.

20. The device as claimed in claim 19, wherein the software comprises programs for recognising possible animal parts and for determining target positions associated therewith.

21. The device as claimed in claim 17, wherein the sensor is located on the robot arm.

22. The device as claimed in claim 21, wherein the robot arm controller controls the robot arm to follow an animal part during movement thereof.

* * * * *